(12) United States Patent
Geiser et al.

(10) Patent No.: US 12,173,786 B1
(45) Date of Patent: Dec. 24, 2024

(54) OIL COLLECTOR FOR MECHANICAL LIMITED SLIP DIFFERENTIAL

(71) Applicant: Schaeffler Technologies AG & Co. KG, Herzogenaurach (DE)

(72) Inventors: Jordan Geiser, Massillon, OH (US); Michael Hodge, Wadsworth, OH (US); Matthew Fowler, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/409,903

(22) Filed: Jan. 11, 2024

Related U.S. Application Data

(60) Provisional application No. 63/525,986, filed on Jul. 11, 2023.

(51) Int. Cl.
| | | |
|---|---|---|
| *F16H 57/04* | (2010.01) | |
| *B60K 17/16* | (2006.01) | |
| *F16H 48/40* | (2012.01) | |

(52) U.S. Cl.
CPC ......... *F16H 57/0483* (2013.01); *B60K 17/20* (2013.01); *F16H 48/40* (2013.01); *F16H 57/0423* (2013.01); *F16H 57/0424* (2013.01)

(58) Field of Classification Search
CPC .. F16H 57/0483; F16H 48/40; F16H 57/0423; F16H 57/0424; B60K 17/20
See application file for complete search history.

(56) References Cited

U.S. PATENT DOCUMENTS

| | | | |
|---|---|---|---|
| 10,816,084 B2 * | 10/2020 | Imanishi | F16H 57/0423 |
| 2018/0038475 A1 * | 2/2018 | Nadayoshi | F16H 48/08 |
| 2018/0106357 A1 * | 4/2018 | Kawakami | F16H 57/0423 |
| 2019/0271386 A1 * | 9/2019 | Suzuki | F16H 48/08 |

FOREIGN PATENT DOCUMENTS

| | | | | |
|---|---|---|---|---|
| CN | 203335772 U | * | 12/2013 | ............ F16H 48/08 |
| CN | 110529578 A | * | 12/2019 | ............ F16H 48/08 |
| CN | 114607748 A | * | 6/2022 | ............ F16H 48/08 |
| JP | H0236990 Y2 | * | 10/1990 | ............... F16H 1/45 |
| JP | 2004211769 A | * | 7/2004 | ......... F16H 57/0483 |
| SE | 524027 C2 | * | 6/2004 | ......... F16H 57/0447 |

* cited by examiner

*Primary Examiner* — Tisha D Lewis
(74) *Attorney, Agent, or Firm* — Volpe Koenig

(57) ABSTRACT

A differential for an e-axle that includes an oil collector for enhancing oil distribution to the differential. Unlike conventional differentials, a differential in accordance with the present disclosure is not submerged in fluid. Rather, the oil collector collects fluid sprayed by other transmission components (e.g., a ring gear) and directs the fluid to the differential.

20 Claims, 7 Drawing Sheets

OIL COLLECTOR FOR MECHANICAL LIMITED SLIP DIFFERENTIAL

CROSS-REFERENCE TO RELATED APPLICATIONS

This application claims the benefit of U.S. Provisional Application Ser. No. 63/525,986 filed on Jul. 11, 2023, which is incorporated by reference herein in its entirety.

TECHNICAL FIELD

The present disclosure is directed to a differential for an electric axle and, more particularly for an oil collector for a differential.

BACKGROUND

In general, electric axles (e-axles) are known structures used in motor vehicles, such as battery electric vehicle and hybrids. E-axles can include a number of components such as one or more electric motors, electronic components, and transmission elements. Typical transmission elements include a differential coupled to axle half-shafts for transmitting torque from the electric motor to the wheels of the vehicle.

SUMMARY

In e-axle applications, conventional fluid-filled differentials having a relatively large volume of fluid have increased drag and the large volume of fluid can present a contamination risk to the electric motor and/or electronic components of the e-axle. Accordingly, it has been found to be desirable to reduce the fluid requirements of the transmission components of the e-axle while maintaining acceptable performance. The present disclosure sets forth a mechanical limited slip differential for an e-axle that includes an oil collector for enhancing oil distribution to the differential. Unlike conventional differentials, a differential in accordance with the present disclosure is not submerged in fluid. Rather, the oil collector collects fluid dispersed by other transmission components (e.g., a ring gear, a baffle, a dedicated fluid supply) and directs the fluid to gears of the differential.

In accordance with one aspect of the present disclosure, a differential for an e-axle comprises a housing having a cavity for supporting at least one component of the differential, a cover enclosing the cavity, and a collector for collecting and directing fluid from an exterior of the housing to the cavity.

The collector can include a circumferential side wall outside the cavity configured to collect fluid on a radially inner surface thereof. The collector can include at least one passageway extending from the exterior of the cavity to the cavity. The at least one passageway can extend parallel to an axis of rotation of the differential. The collector can include a radially-inwardly extending circumferential lip extending from the circumferential side wall. The collector and the cover can be a unitary one-piece structure. The collector can be attached to the cover. The cover can include at least one passageway extending from the exterior of the cavity to the cavity, and the collector includes at least one passageway extending from the exterior of the cavity to the cavity, the at least one passageway of the collector received in the at least one passageway of the cover. The collector can be snap-fit to the cover. The differential can be a mechanical limited slip differential.

In accordance with another aspect, a cover for enclosing a cavity of a housing of a differential for an e-axle comprises a cover body including a collector for collecting fluid and directing the fluid to the cavity of the housing.

The collector can include a circumferential side wall configured to collect fluid on a radially inner surface thereof. The collector can include least one passageway extending from the exterior of the cavity to the cavity. The at least one passageway can extend parallel to an axis of rotation of the differential. The collector can further include a radially-inwardly extending circumferential lip extending from the circumferential side wall. The collector and the cover can be a unitary one-piece structure. The collector can be attached to the cover. The cover can include at least one passageway for fluidly communication between an exterior of the cavity and the cavity, and the collector can include at least one passageway, the at least one passageway of the collector received in the at least one passageway of the cover. The collector can be snap-fit to the cover.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
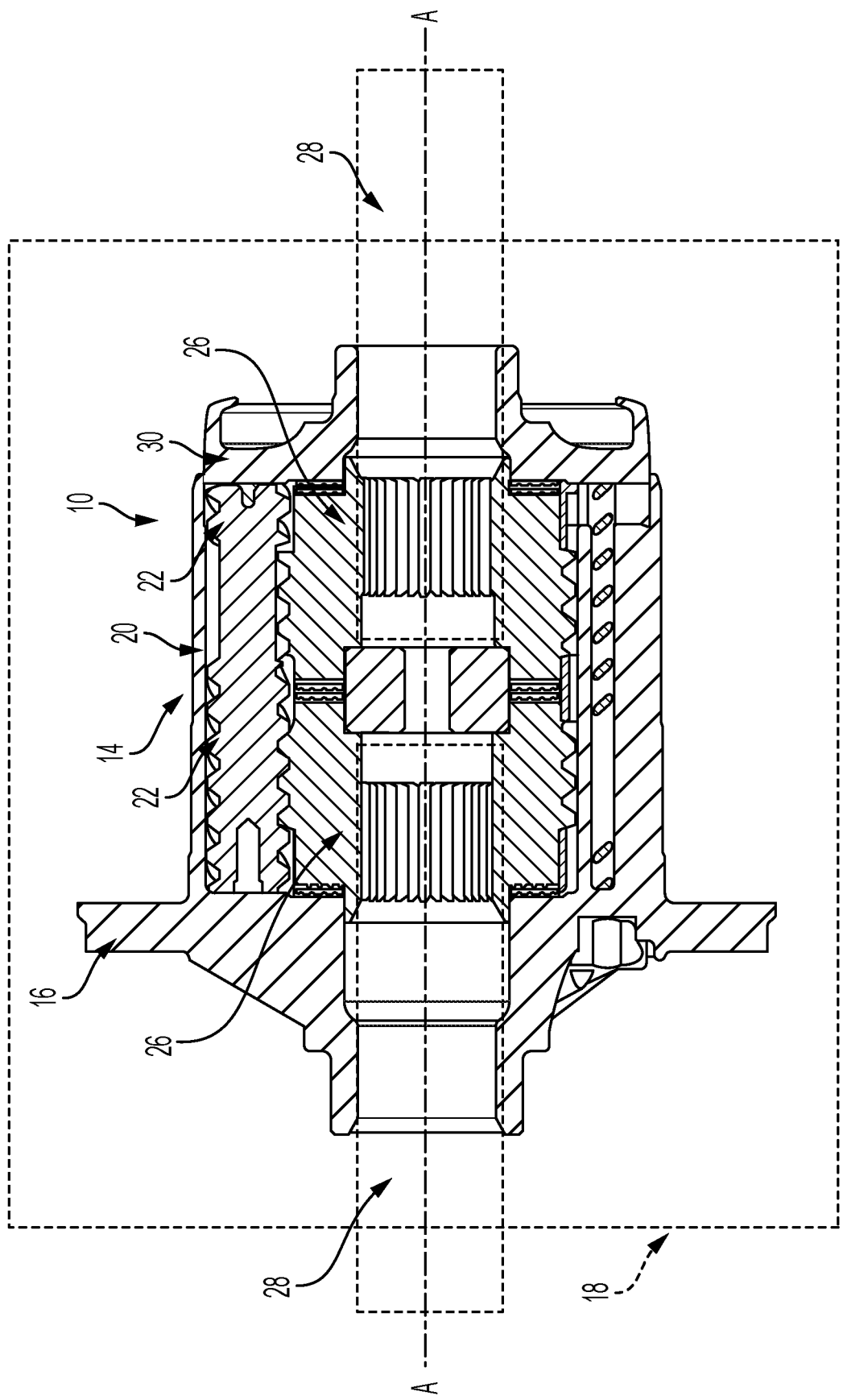
FIG. 1 is a cross-sectional view of an exemplary differential for an e-axle assembly in accordance with an embodiment of the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In FIG. 1, an exemplary differential in accordance with the present disclosure is illustrated and identified generally by reference numeral 10. The differential 10 includes a housing 14 supported for rotation about an axis A-A in an e-axle housing 18. A ring gear 16 (partially shown) is coupled to the housing and is driven by a pinion (not shown) operatively coupled to an output shaft of an electric motor. The housing 14 includes a cavity 20 in which pinion gears 22 are supported for rotation and engaged with side gears 26. The side gears 26 are configured to be rotationally coupled to axle half-shafts 28. A cover 30 is secured to the housing 14 and encloses the cavity 20.

In operation, rotation of the ring gear 16 rotates the housing 14 and pinion gears 22, which in turn rotate the side gears 26 for transmitting torque from the ring gear through the pinion gears 22 and side gears 26 and axle half-shafts 28 to respective wheels of a vehicle. As the side gears 26 are supported for rotation relative to the housing 18, each side gear 26 can have a different rate of rotation under certain conditions. The illustrated differential is exemplary in nature and it will be appreciated that aspects of the present disclosure can be used with a wide range of differential types and styles.

In a conventional e-axle, the e-axle housing is typically filled with fluid such that a lower portion of the ring gear 16 (e.g., the lower half) and/or other portions of the differential are submerged. As the ring gear 16 and differential components rotate, fluid is easily distributed throughout the e-axle housing including to the differential. However, the e-axle housing 18 of the present disclosure contains a minimal amount of fluid. In one example, the e-axle housing 18 is only filled with enough fluid such that only a lower portion of the ring gear is submerged in fluid and the differential 10 is not submerged at all. Accordingly, distribution of fluid to the differential 10 is not as readily achieved.

Figure 2:
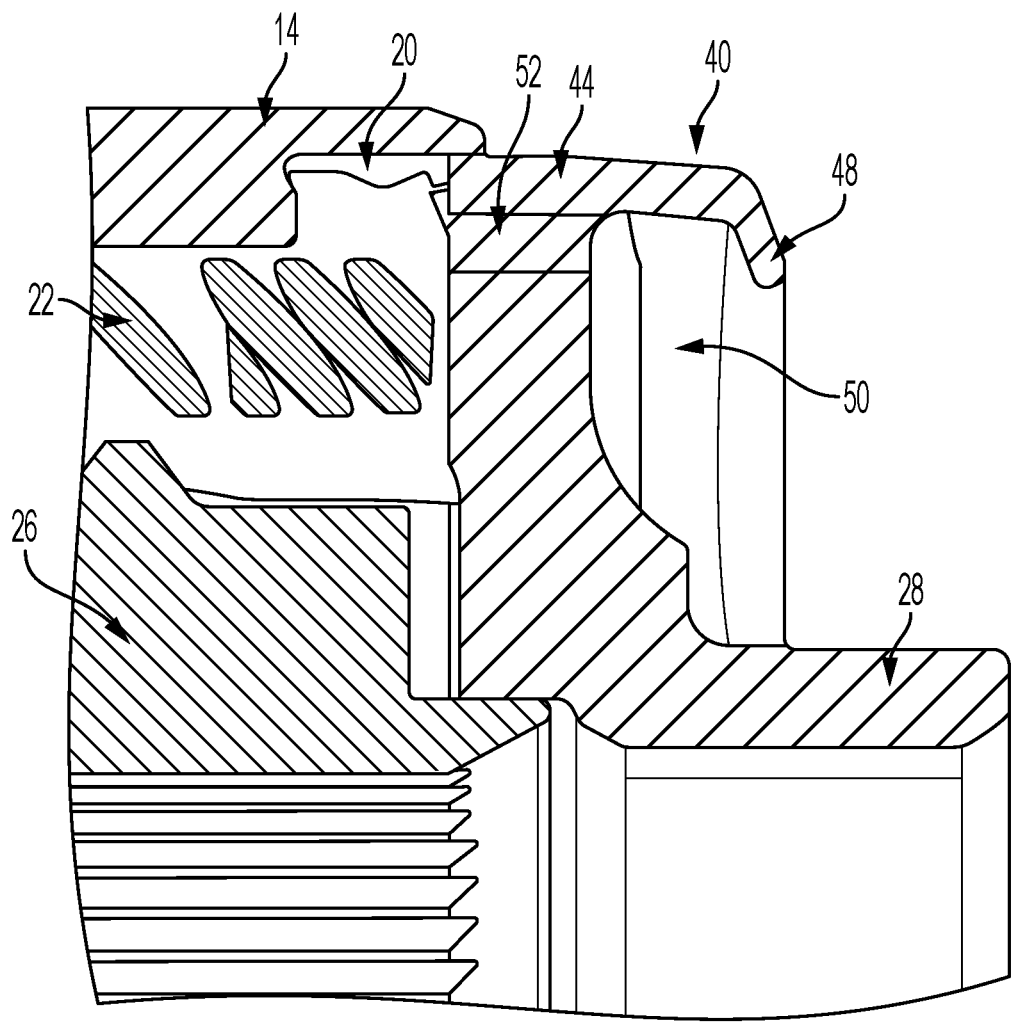
FIG. 2 is a cross-sectional view taken through a passageway of a collector of the differential of FIG. 1.

Turning to FIG. 2, and in accordance with the present disclosure, the cover 30 includes a fluid collector 40 for collecting and distributing fluid to the chamber 20 of the housing 14. The collector 40 includes an axially extending circumferential side wall 44 having a radially inwardly extending circumferential lip 48. The circumferential side wall 44 and lip 48 form a circumferential channel 50 that collects fluid that is forced radially outwardly by centrifugal force as the housing 14 and/or other components rotate. The fluid is directed along the radially inner surfaces of the circumferential side wall 44 to axially extending passageways 52 in the cover 30 that are in fluid communication with the chamber 20. The channel 50 need not be circular in cross-section (e.g., in a direction perpendicular to axis A-A) and, in a typical application, has a non-circular cross-sectional shape that assists with directing fluid to the passages 50 (described further below in connection with FIG. 5). Accordingly, fluid circulating within the e-axle housing 18 is collected and directed to the chamber 20 by the collector 40 thereby increasing fluid flow to the pinion and side gears 22 and 26 and other components of the differential 10.

In the example of FIGS. 1 and 2, the collector 40 is integral with the cover 30. Accordingly, the cover 30 can be stamped, cast machined or otherwise manufactured to include the above-described features of the collector 40. In one example, the cover 30 is a monolithic, one-piece structure bolted or otherwise secured to the housing 14.

Figure 3:
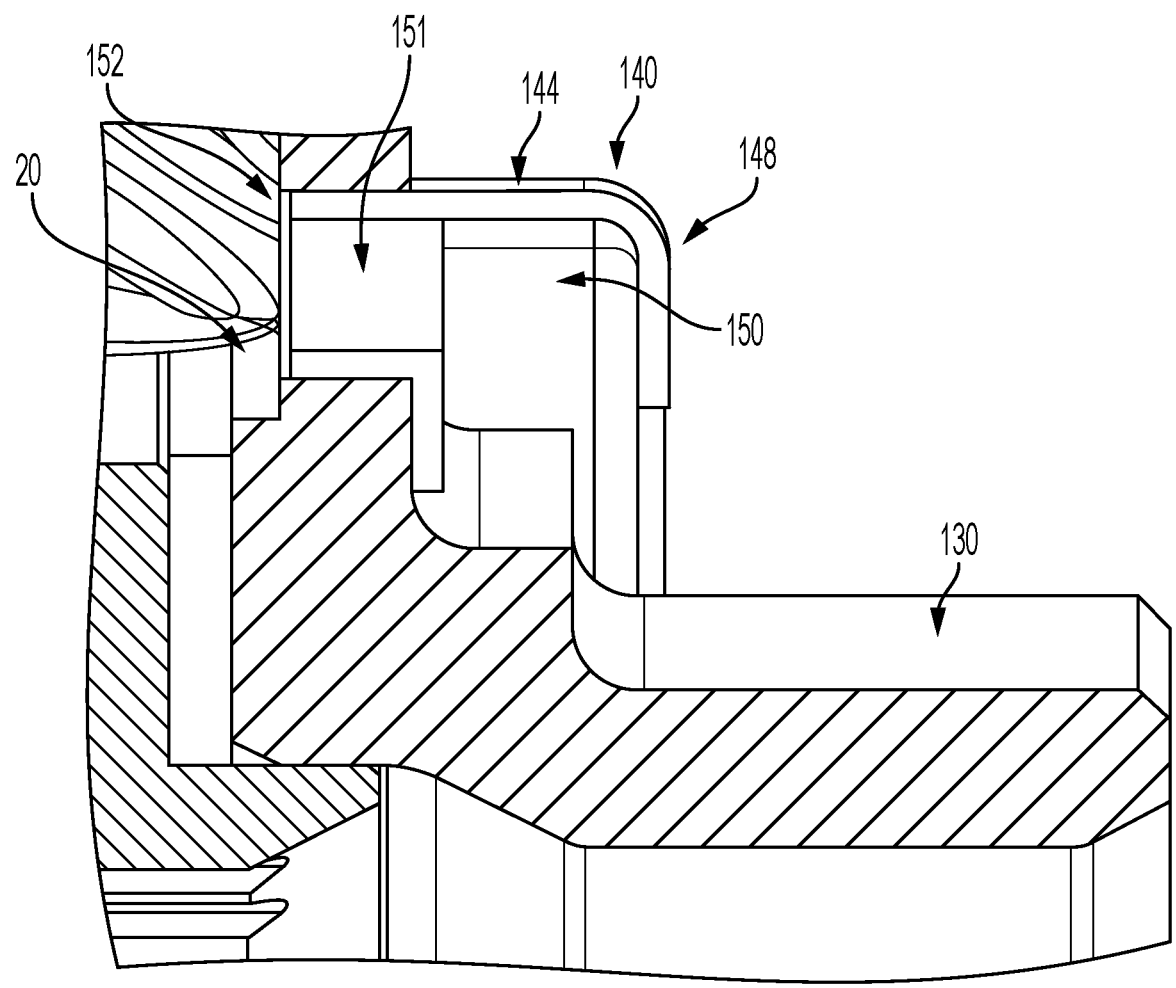
FIG. 3 is a cross-sectional view taken through a passageway of a collector of an exemplary differential in accordance with another embodiment of the present disclosure.
Figure 4:
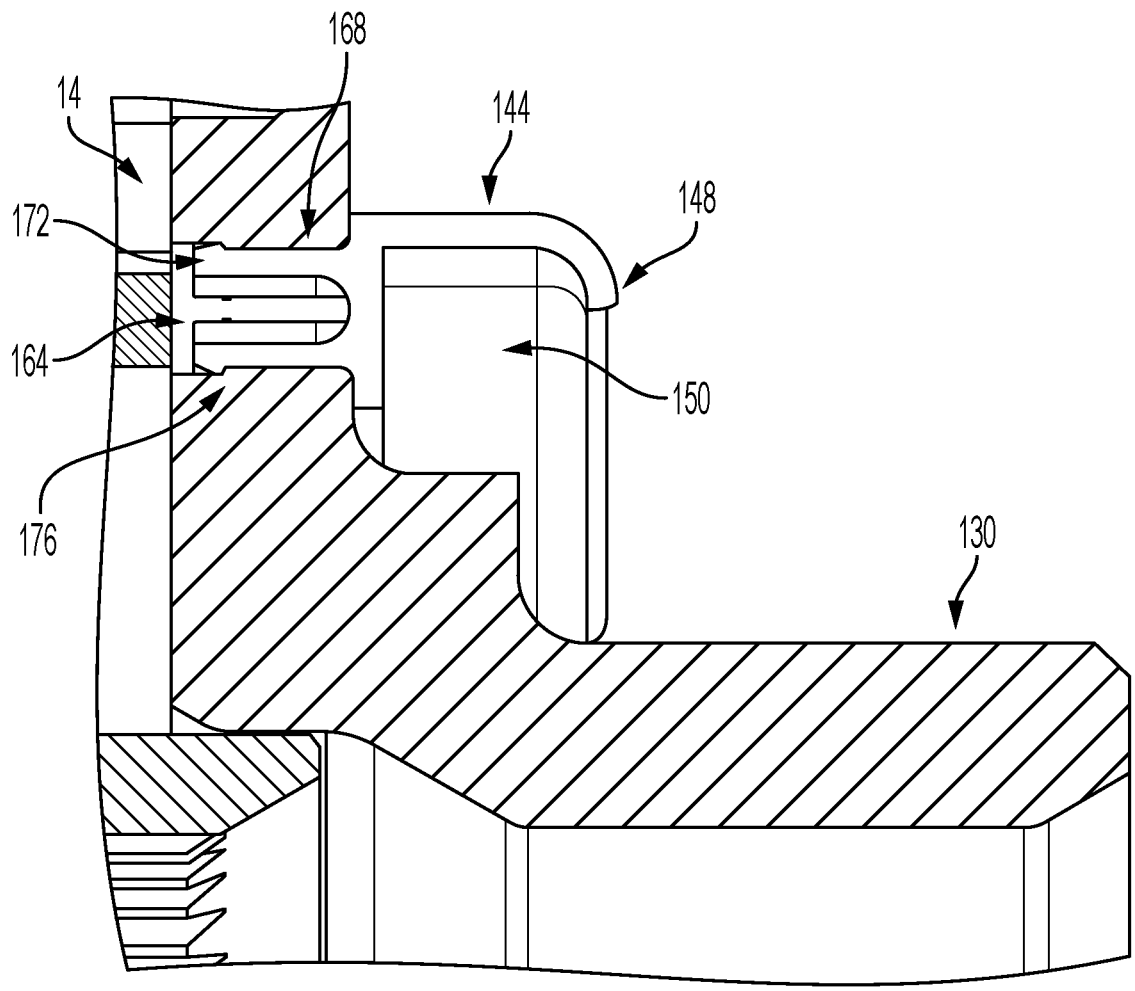
FIG. 4 is a cross-sectional view taken through a connection element of the collector of FIG. 3.
Figure 5:
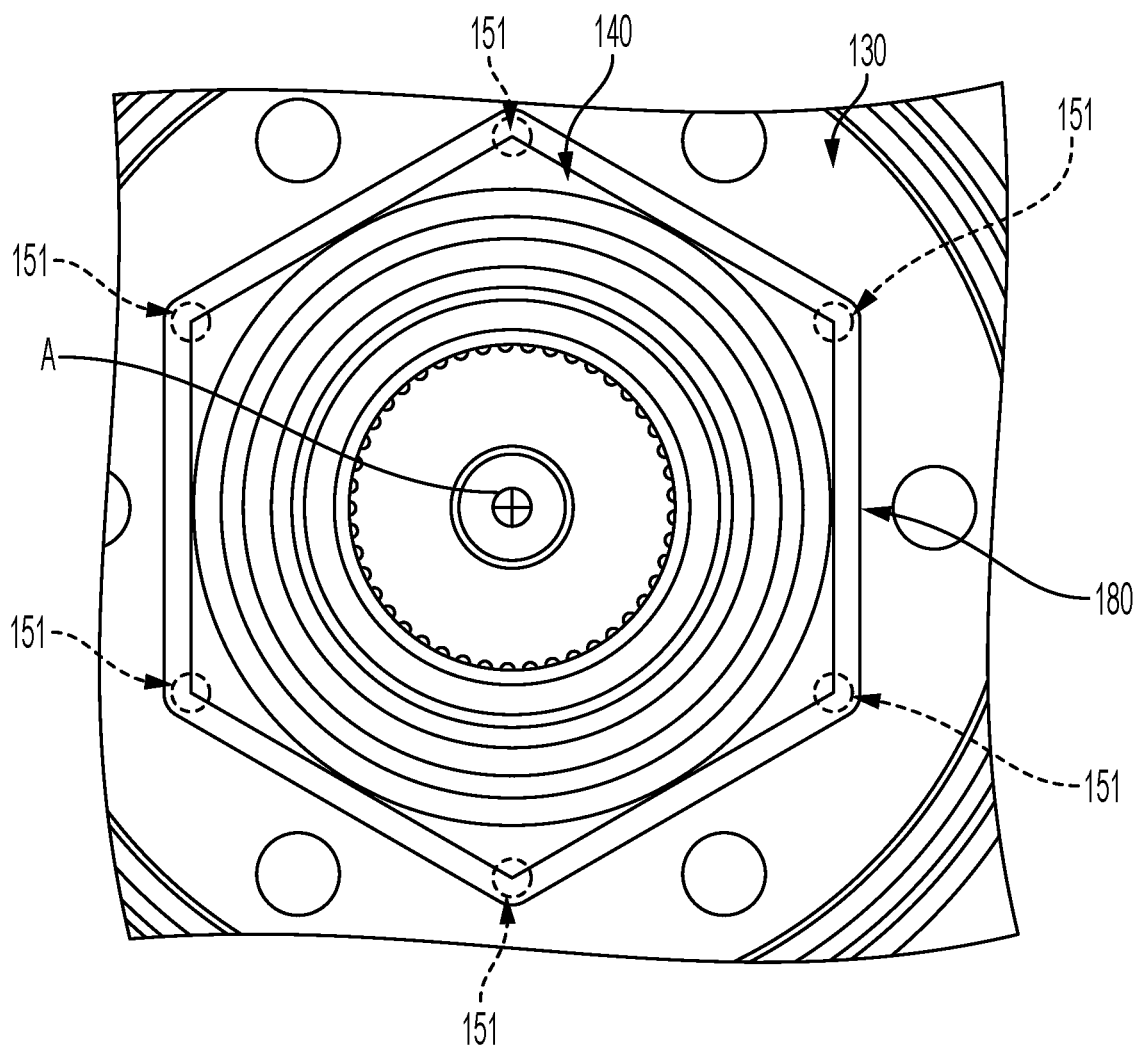
FIG. 5 is an end view of the collector of FIGS. 3 and 4.

With additional reference to FIGS. 3-5 another example of a collector in accordance with the present disclosure is illustrated and identified generally by reference numeral 140. It will be appreciated that in this embodiment only the collector and the cover differ from the embodiment of FIGS. 1 and 2 and that aspects of the following description refer to components described in connection with FIGS. 1 and 2, although such components may not appear in FIGS. 3-5.

The collector 140 in this embodiment is secured to a cover body 130. The cover/cover body 130 is similar to the cover 30 but does not include integral collector 40. Instead, the cover 130 in this embodiment has been modified to receive the collector 140. The cover 130 is secured to the housing 14 to enclose the cavity 20.

The collector 140 includes an axially extending circumferential side wall 144 having a radially inwardly extending circumferential lip 148. The circumferential side wall 144 and lip 148 form a circumferential channel 150 that collects fluid that is forced radially outwardly by centrifugal force as the housing 114 and/or other components rotate. The fluid is directed along the radially inner surfaces of the circumferential side wall 144 to axially extending passageways 151 of the collector 140 that extend at least partially into axially extending passageways 152 in the cover 130 that are in fluid communication with the chamber 20. Accordingly, fluid circulating within the e-axle housing 18 is collected and directed to the chamber 20 by the collector 140 thereby increasing fluid flow to the pinion and side gears 22 and 26 and other components of the differential 10.

The cover 130 includes a plurality of bores 164 configured to receive corresponding stakes 168 of the cover 140. The stakes 168 are configured as snap-fit members and a distal end of the stakes 168 include a barb 172 adapted to engage a flange 176 of the cover 140 to restrict separation of the collector 140 from the cover 130.

In FIG. 5, it is seen that the collector 140 has a non-circular cross-sectional shape. In this example, the collector 140 has a hexagonal cross-sectional shape defined by the circumferential sidewall 144. In this regard, the circumferential sidewall 144 includes six sides 180, each side extending tangential to the axis of rotation of the housing cover A. The passageways 151 are located adjacent a vertex of two sides 180. Accordingly, fluid will tend to flow along the circumferential sidewall 144 to the passageways 150. Other cross-sectional shapes are possible.

The collector 140 can be made of a plastic or composite material, such as glass-filled nylon or other suitable material.

Figure 6:
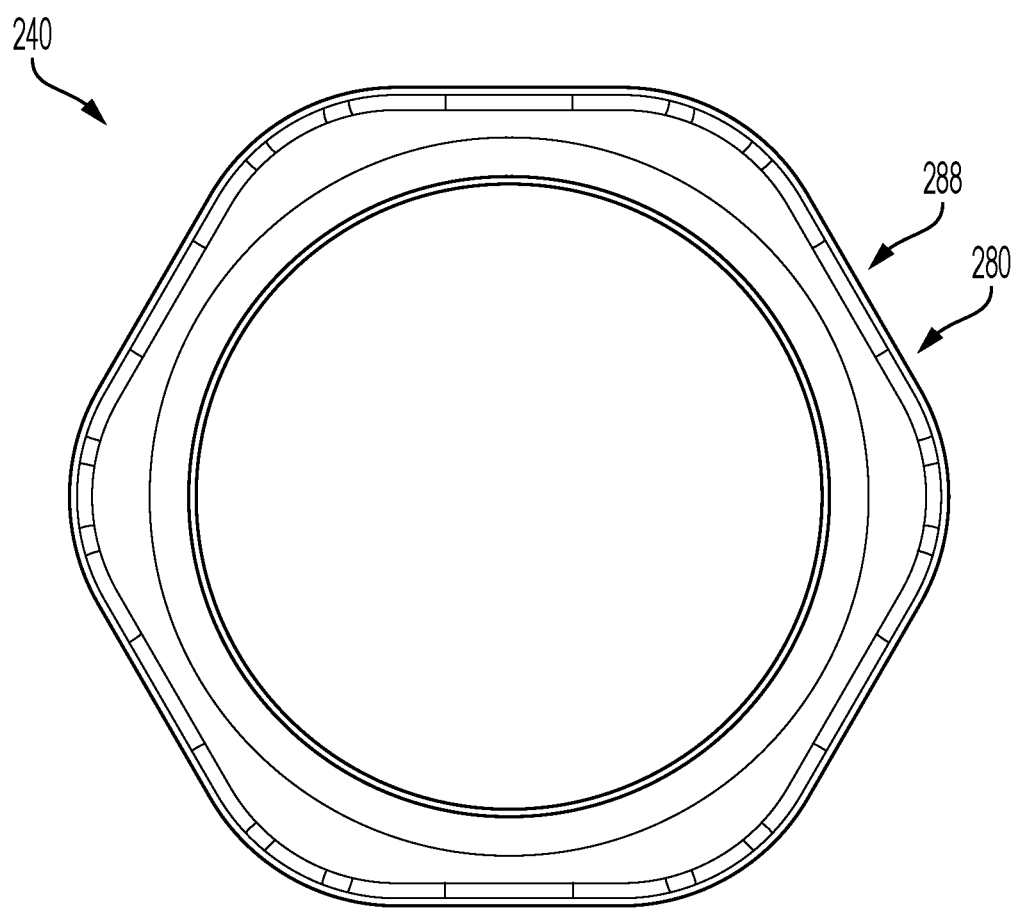
FIG. 6 is a front view of a collector according to another embodiment of the present disclosure.
Figure 7:
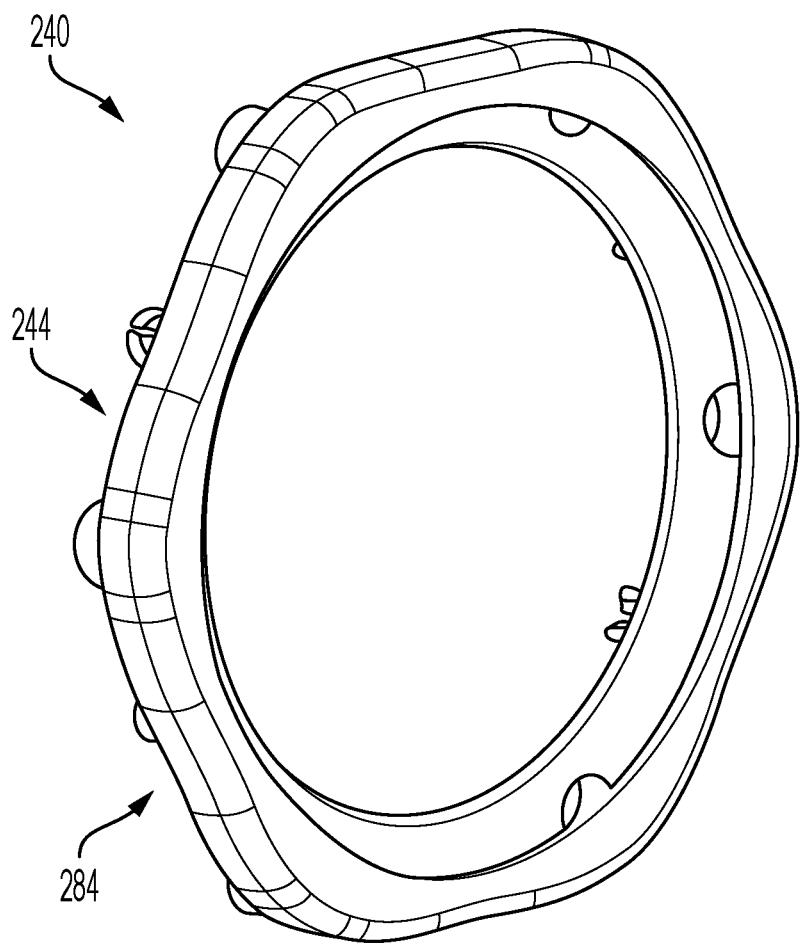
FIG. 7 is a perspective view of the collector of FIG. 6.

Turning to FIGS. 6 and 7, another exemplary collector in accordance with the present disclosure is illustrated and identified generally by reference numeral 240. The collector 240 is identical to the collector 140 shown and described in connection with FIGS. 3-5 except for the cross-sectional shape of circumferential sidewall 244. In this embodiment, the circumferential sidewall 244 is still generally hexagonal in cross-sectional shape and includes six sides 280. However, the sides 280 each include a concave portion 284.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 differential
14 housing
16 differential
18 e-axle housing 20 cavity
22 pinion gears
26 side gears
28 axle shafts
30 cover
40 fluid collector
44 circumferential sidewall
48 circumferential lip
50 circumferential channel
52 passageways
130 cover
140 fluid collector
144 circumferential sidewall
148 circumferential lip
150 circumferential channel
151 passageways (cover)
152 passageways (fluid collector)
164 bores
168 stakes
172 barbs
176 flange
180 segment (sidewall)
240 fluid collector
244 circumferential sidewall
280 segment (sidewall)
284 concave portion

What is claimed is:

1. A differential for an e-axle comprising:
a housing having a cavity for supporting at least one component of the differential;
a cover enclosing the cavity; and
a collector for collecting and directing fluid from an exterior of the housing to the cavity;
wherein the collector includes a circumferential side wall outside the cavity configured to collect fluid on a radially inner surface thereof;
wherein the collector includes at least one passageway extending from the exterior of the cavity to the cavity;
wherein the collector further includes a radially-inwardly extending circumferential lip extending from the circumferential side wall; and
wherein the lip and the passageway are coextensive in a radial direction.

2. The differential according to claim 1, wherein the at least one passageway extends parallel to an axis of rotation of the differential.

3. The differential according to claim 1, wherein the collector and the cover are a unitary one-piece structure.

4. The differential according to claim 1, wherein the collector is attached to the cover.

5. The differential according to claim 4, wherein the cover includes at least one passageway extending from the exterior of the cavity to the cavity, and the collector includes at least one passageway extending from the exterior of the cavity to the cavity, the at least one passageway of the collector received in the at least one passageway of the cover.

6. The differential according to claim 4, wherein the collector is snap-fit to the cover.

7. The differential according to claim 1, wherein the differential is a mechanical limited slip differential.

8. An e-axle including the differential of claim 1.

9. A cover for enclosing a cavity of a housing of a differential for an e-axle comprising;
a cover body including a collector for collecting fluid and directing the fluid to the cavity of the housing;
wherein the collector includes a circumferential side wall configured to collect fluid on a radially inner surface thereof;
wherein the collector includes least one passageway extending from the exterior of the cavity to the cavity;
wherein the collector further includes a radially-inwardly extending circumferential lip extending from the circumferential side wall; and
wherein the lip and the passageway are coextensive in a radial direction.

10. The cover according to claim 9, wherein the at least one passageway extends parallel to an axis of rotation of the differential.

11. The cover according to claim 9, wherein the collector and the cover are a unitary one-piece structure.

12. The cover according to claim 9, wherein the collector is attached to the cover.

13. The cover according to claim 12, wherein the cover includes at least one passageway for fluidly communication between an exterior of the cavity and the cavity, and the collector includes at least one passageway, the at least one passageway of the collector is received in the at least one passageway of the cover.

14. The cover according to claim 13, wherein the collector is snap-fit to the cover.

15. The differential according to claim 1, wherein the radially inner surface of the collector has a non-circular cross-sectional shape.

16. The differential according to claim 15, wherein the non-circular cross-sectional shape comprises a hexagon.

17. The differential according to claim 16, wherein the at least one passageway is located at a vertex of two sides of the hexagon.

18. The cover according to claim 9, wherein the radially inner surface of the collector has a non-circular cross-sectional shape.

19. The cover according to claim 18, wherein the non-circular cross-sectional shape comprises a hexagon.

20. The cover according to claim 19, wherein the at least one passageway is located at a vertex of two sides of the hexagon.

* * * * *